Oct. 27, 1959          E. M. APPLE          2,910,156
POWER OPERATED EMERGENCY BRAKE
Filed Jan. 22, 1958          4 Sheets-Sheet 2
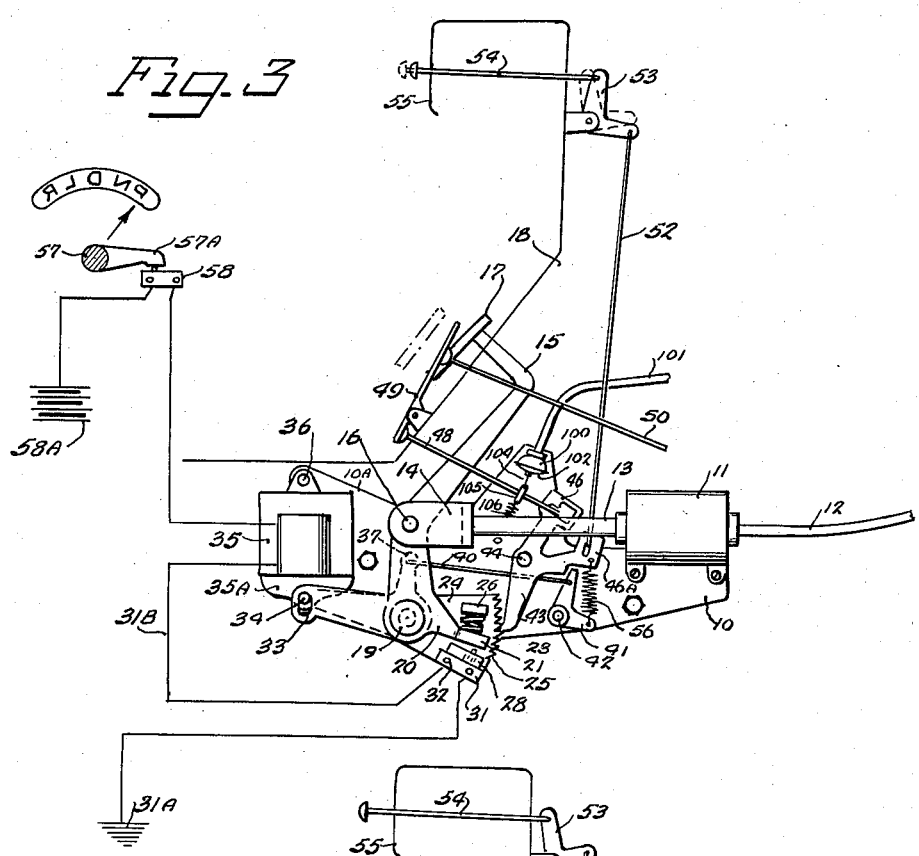
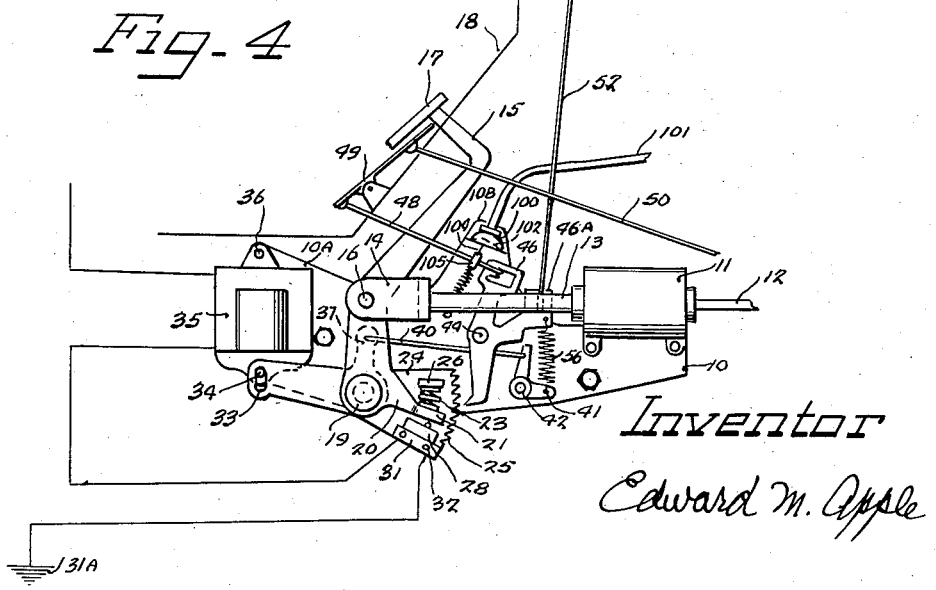
Inventor
Edward M. Apple

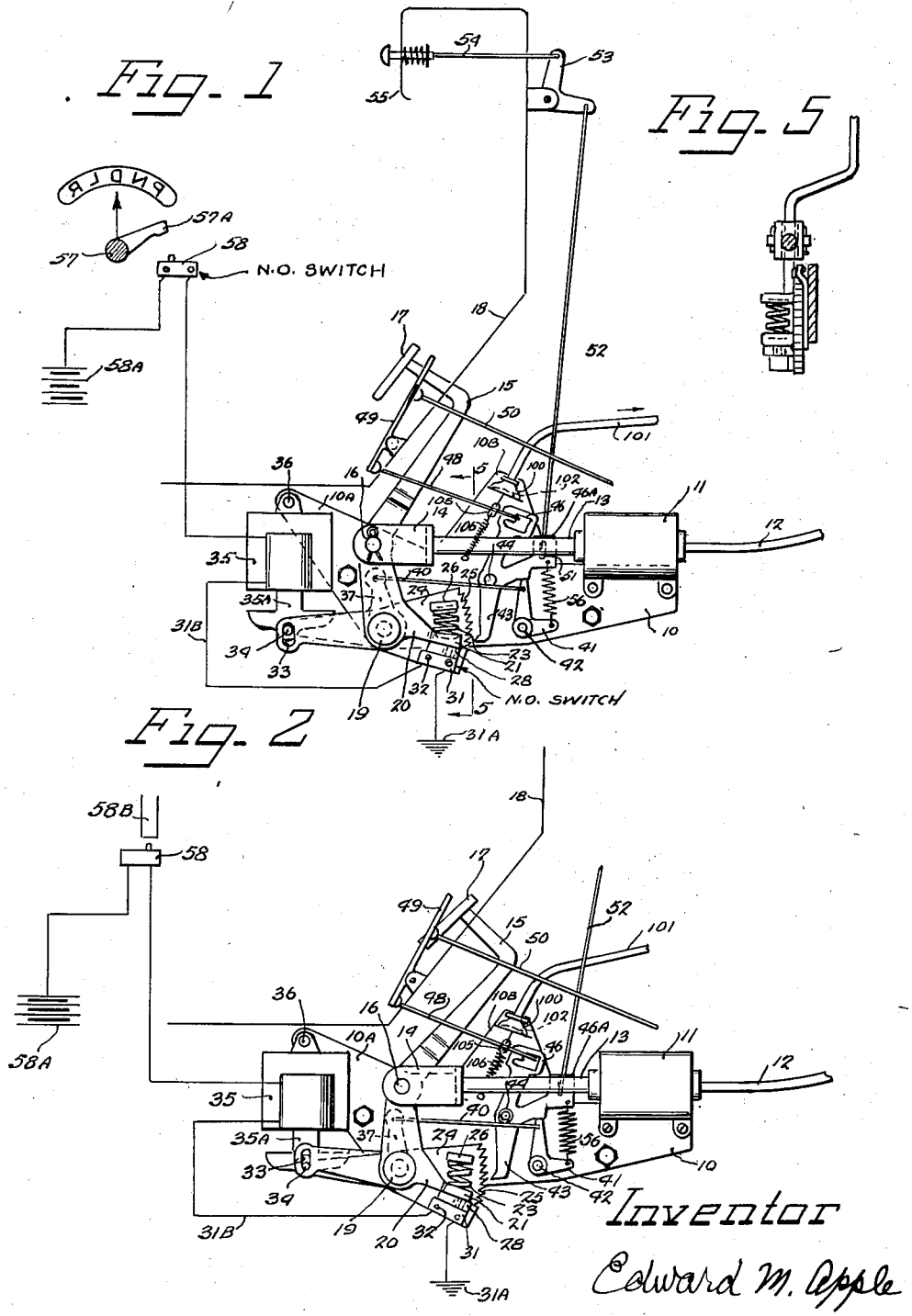

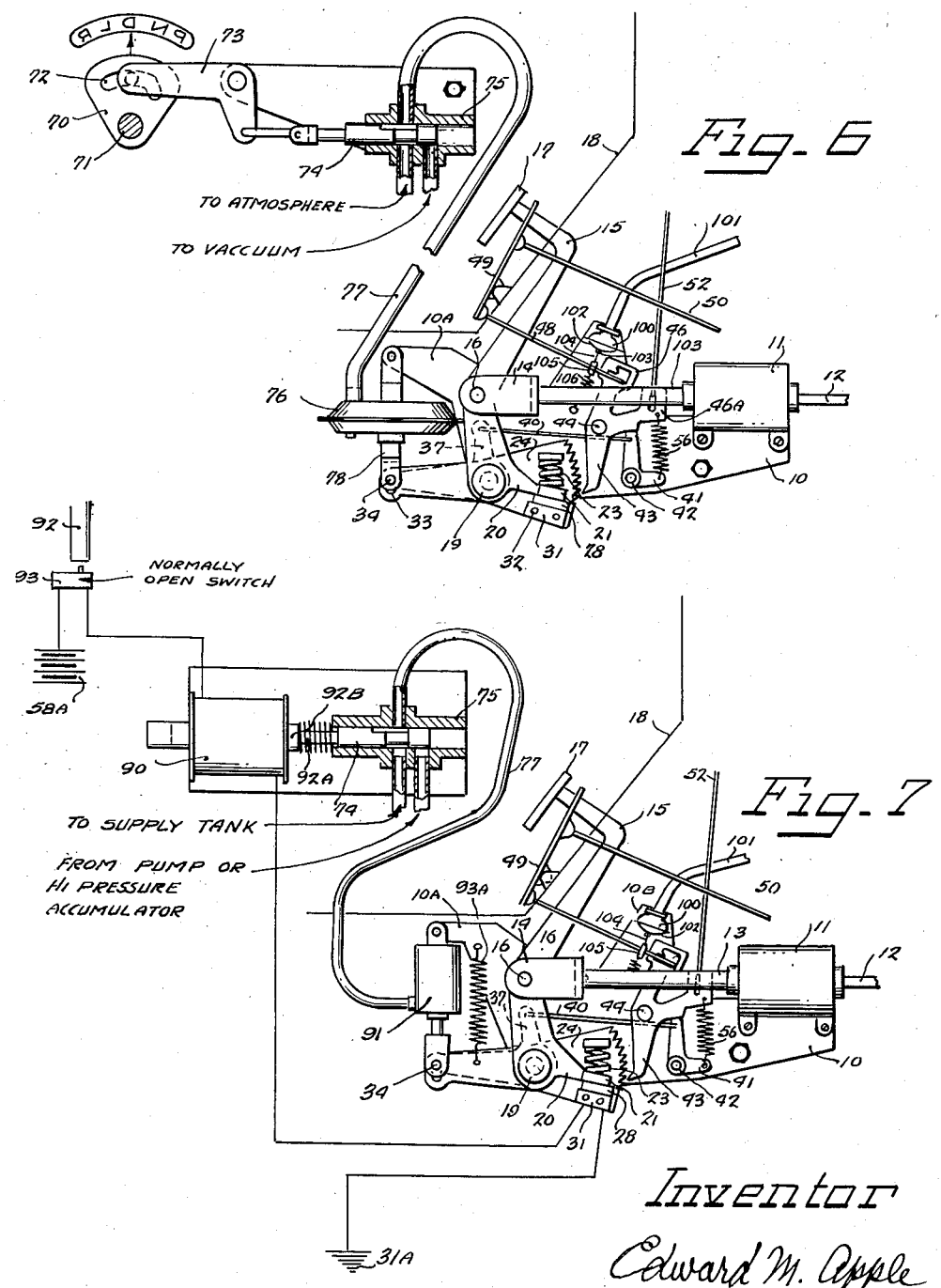

Oct. 27, 1959  E. M. APPLE  2,910,156
POWER OPERATED EMERGENCY BRAKE
Filed Jan. 22, 1958  4 Sheets-Sheet 4
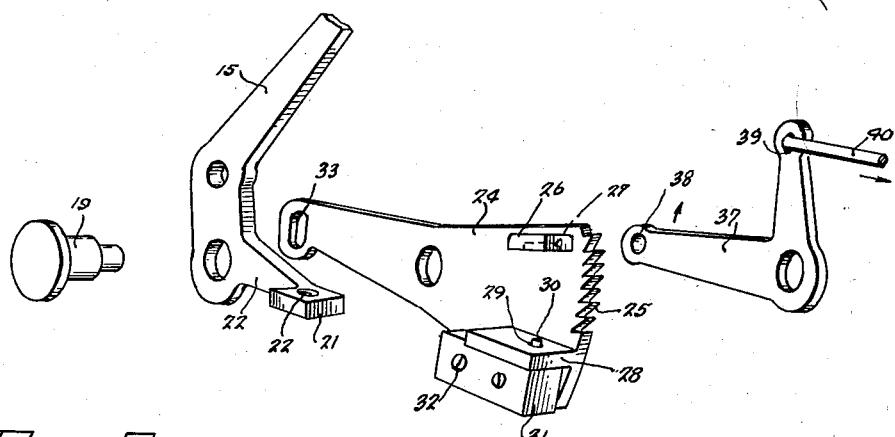
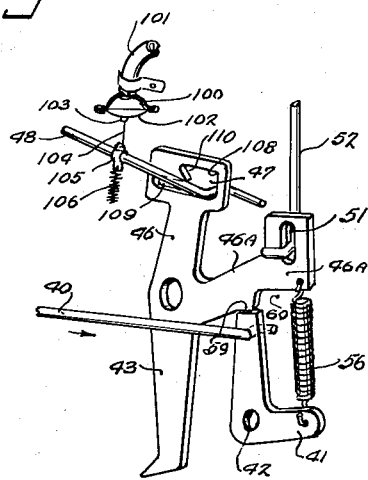
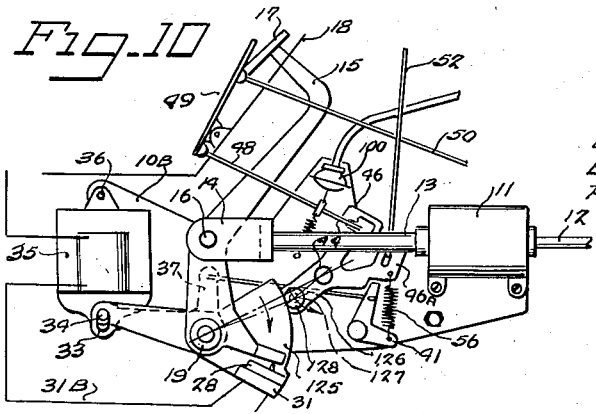
Inventor
Edward M. Apple

United States Patent Office 2,910,156
Patented Oct. 27, 1959

2,910,156

POWER OPERATED EMERGENCY BRAKE

Edward M. Apple, Detroit, Mich., assignor to Joseph Martin, Detroit, Mich.

Application January 22, 1958, Serial No. 710,432

9 Claims. (Cl. 192—3)

This invention relates to an emergency braking system for motor vehicles with automatic transmissions, and has particular reference to a device which may function as a conventional service brake under normal driving conditions, but when implemented with other elements may function as a power operated emergency brake.

This invention may be considered an improvement on the device disclosed in United States patent issued to Martin, No. 2,821,275, January 28, 1958.

An object of this invention is to provide automatic power means, for setting and releasing the service brakes for use as an emergency brake, which power means are responsive to the movement of the automatic transmission speed selector controls.

Another object of this invention is to provide auxiliary power means for controlling the service brakes under certain conditions, without interfering with the normal operation of the service brakes.

Another object of the invention is to provide independent automatic power means for setting the service brakes when the automatic transmission speed selector control is in "park" position, and means to release said brakes when said selector control means are moved to another position.

Another object of this invention is to provide auxiliary power means for setting and locking the service brakes, under certain conditions, with automatic as well as manual means for releasing said brakes.

Another object of this invention is to provide automatic power means for holding in locked condition the service brakes as an emergency brake, even though there might be a failure of the hydraulic or vacuum power normally used to actuate said service brakes.

Another object of this invention is to provide means for setting and holding in locked condition the service brakes, without danger of draining the electrical energy from the storage battery of the vehicle.

The foregoing and other objects and advantages of the invention will become more apparent as the description proceeds, reference being made from time to time to the accompanying drawing forming a part of the within disclosure, in which drawing:

Fig. 1 is a diagrammatic view, with parts in elevation, of a device embodying the invention and in brakes "off" or driving position. In this embodiment I illustrate a solenoid operated mechanism, which is controlled by a conventional lever type of automatic transmission selector.

Fig. 2 is a view similar to Fig. 1, but with the brakes in "on" position. In this embodiment the solenoid is controlled by a "push button" type of automatic transmission selector, which may be located on the dash, on the steering column or elsewhere.

Fig. 3 is a view similar to Fig. 1, but with the brakes "on," and the transmission selector in "park" position.

Fig. 4 is a view similar to Fig. 3, with the motor running, showing the brakes having been released, by the auxiliary manual brake release mechanism, located on the dash, or other suitable location, or by depressing the accelerator pedal. Depressing the accelerator pedal will release the brakes only when the engine is running. In this view the brakes have been released but the solenoid has not "dropped out" as yet. Normally the manual releasing mechanism and solenoid would function almost simultaneously, if the ignition switch were "on."

Fig. 5 is a section taken substantially on the line 5—5 of Fig. 1.

Fig. 6 is a view similar to Fig. 1, but with a vacuum operated brake mechanism, controlled by a cam on the transmission selector shaft.

Fig. 7 is a view similar to Fig. 1, but illustrating a hydraulic brake mechanism, controlled by an auxiliary solenoid in conjunction with a "push button" type of transmission selector.

Fig. 8 is an enlarged composite detail in perspective, showing the relationship of certain of the operating parts of the mechanism.

Fig. 9 is an enlarged fragmentary detail, illustrating the latch mechanism.

Fig. 10 is a view showing a modified form of latch mechanism, employing a roller and quadrant.

Fig. 11 is a diagrammatic view of the circuit shown in Fig. 1.

Referring now more particularly to the drawings, it will be understood that in the embodiment herein disclosed, the reference character 10 indicates a base plate, which is secured by any suitable means to the frame or body of a motor vehicle (not shown).

The base plate 10 carries a conventional master brake cylinder assembly 11. Connected to one end of the cylinder 11 is a flexible metal tube 12, which carries the brake fluid to the distributor fitting, and hence to the motor vehicle brake cylinders (not shown).

A piston rod 13 enters the opposite end of the master cylinder 11 and operates the piston therein. Attached to the end of the piston rod 13 is a clevis 14, which in turn is connected to the brake pedal 15 by a cross pin 16. The brake pedal 15 has a conventional foot piece 17 attached to the free end, which terminates within the body 18 of the vehicle in a conventional manner. The pedal 15 is pivoted for rotation on a stud 19, which is riveted to the base plate 10. Extending beyond the pivot point 19 of the pedal 15 is an extension 20, which has an enlarged portion 21 thereon. A spring seat 22 is formed in the enlarged portion 21 and is arranged to receive one end of a relatively heavy compression spring 23. Also pivoted on the stud 19 is a power operable plate 24, which has a series of ratchet teeth 25 formed at one end. A top lug 26, which has a spring seat 27 (Fig. 8) arranged to receive the opposite end of the compression spring 23, and a bottom stop lug 28 are formed with the plate 24. The bottom stop lug 28 has a hole 29 (Fig. 8), through which the operating pin 30 of a "micro" type snap switch 31 extends. The switch 31 is grounded as at 31A and connects as at 31B to the solenoid 35. The switch 31 is secured to the plate 24 by two screws 32. The opposite end of the plate 24 has a slot 33 (Fig. 8) arranged to receive the clevis pin 34 which is secured to the armature 35A of pull type solenoid 35, which is pivoted by a bolt 36 to an extension 10A formed on the base plate 10.

Also pivoted on the pin 19 is a bell crank lever 37 (Fig. 8), one arm of which has a hole 38 arranged to receive the clevis pin 34 and the other arm of which has a hole 39 arranged to receive one end of a latch control rod 40. The other end of the control rod 40 is connected to a latch 41, which is pivoted, as at 42, to the base plate 10.

A holding pawl 43 (Fig. 9) is also pivoted, as at 44, to the base plate 10. The lower end 45 of the pawl 43 is formed to engage the ratchet teeth 25 on the plate 24. There are two upper legs 46, 46A formed on the pawl 43. The leg 46 has a slot 47 formed therein to receive one end of an automatic trip rod 48. The other end of trip rod 48 is attached to the heel end of the accelerator pedal 49 of the vehicle. Attached to the toe end of the pedal 49 is a conventional carburetor control rod 50.

The other leg 46A of pawl 43 (Fig. 9) has a slot 51, adapted to receive the manual trip rod 52, which is operated by a bell crank 53, and a pull rod 54 which extends through the instrument panel 55 of the vehicle. A spring 56 (Fig. 9) connects the latch 41 to leg 46A of the holding pawl 43 and serves to actuate both of them.

A conventional transmission speed selector shaft 57 is mounted on the steering column (not shown) and has attached to its lower end an arm 57A, adapted to close a normally open micro type snap switch 58 (shown diagrammatically in Fig. 1) when the selector shaft 57 is in the "park" position. The switch 58 is connected to the storage battery 58A of the vehicle. (Fig. 2 shows the same micro switch 58 operated by the "park" button 58B of a conventional push button type of selector control.)

OPERATION

When the car is being driven the service brakes operate in the normal manner. Pressure on the brake pedal 15, moves it about the pivot 19, and piston rod 13 is forced into brake cylinder 11, which exerts pressure on the brake fluid throughout the system, and the brake shoes are forced into engagement with the brake drums, as in conventional practice.

Pressure exerted by the compression spring 23, holds the bottom stop lug 28, against the bottom side of the enlarged part 21, of the brake pedal 15, and the plate 24 rotates, as a unit, with the brake pedal 15. The slot 33 in the plate 24 moves freely on the pin 34, and therefore there is no movement of the solenoid armature 35A or of the bell crank 37, which is connected to the armature 35A of the solenoid 35 by the clevis pin 34.

The holding pawl 43 (or the quadrant roller 128 Fig. 10) is held out of engagement by the latch 41, which engages the surface 59 (Fig. 9) of the member 46A. The end of the automatic trip rod 48 (Fig. 9) rides freely in slot 47, in the holding pawl 43, when the pawl 43 is in latched position, and therefore movement of the accelerator pedal 49 has no effect on it.

When the selector 57 is moved to the "park" position, the arm 57A closes the normally open micro switch 58, and current then flows through the solenoid 35, and through the switch 31 (which is held in closed position, by the extension 21 (Fig. 8) on the brake lever 15), and hence to the ground 31A.

The armature 35A of the solenoid 35 is therefore pulled into the field and through the clevis pin 34, the plate 24 is caused to swing about pivot 19. Through the compression spring 23 the brake lever 15 is moved about its pivot 19, and the piston rod 13 is forced into the brake cylinder 11. This action continues until the hydraulic pressure in the cylinder 11, overcomes the pressure exerted by the compression spring 23. At this point the brake pedal 15 stops, but the plate 24 continues to rotate about the pivot 19, under the action of the solenoid 35, and the extension 21 on the brake lever 15 moves away from the bottom stop lug 28 on plate 24.

As this action takes place the operating pin 30 of the micro switch 31 (which has been held in the depressed, or closed position, by the brake lever extension 21) is released, and the switch 31 opens, thereby cutting off the current to the solenoid 35. This action is important since it prevents current drain on the battery.

As the armature 35A of solenoid 35 moves upwardly, the bell crank 37, which is connected to the clevis pin 34, through the hole 38, is rocked about its pivot 19, and moves the latch 41 out of engagement with the holding pawl 43, through the action of the control rod 40. This allows the holding pawl 43 to engage the ratchet teeth 25, on plate 24, and lock it in the brake holding position, even though the current is "off" in the solenoid 35.

This construction allows the brakes to be set with a preset tension, irrespective of the movement required, because the switch 31 is not activated until the spring 23 is compressed enough to release the pin 30, and thereby breaks the current flow.

The brake are released as follows:

Manual release

Pulling the release rod 54, by means of the button 54A located on the instrument panel 55 (or other suitable location) rocks bell crank 53 which is mounted on the forward side of the fire wall 18 and pulls up the control rod 52, which connects with holding pawl 43, in slot 51, and rocks it out of engagement with the plate 24. Plate 24, and brake lever 15, are now free to return to their normal position, through the weight of the solenoid armature 35A, and the hydraulic pressure in the cylinder 11. The slots 51 and 47 in the holding pawl 43, and the slot 33 in the plate 24, are necessary to allow normal action of the braking system.

Automatic release

The accelerator pedal 49 is hinged as shown in Figs. 1 and 2. Its upper end is connected to the carburetor control rod 50, and its lower, or heel, end is connected to the control rod 48. Inward movement of the pedal 49, to speed up the engine pulls the control rod 48, and releases the holding pawl 43. Brakes are then released as previously described.

MODIFICATIONS

The brake mechanism remains exactly the same when operated by a solenoid, by vacuum, or by hydraulic power. The release mechanism is always the same.

In Fig. 6, I show a vacuum powered brake, controlled directly by a cam 70, positioned on one end of the control shaft 71. The cam 70 has a raceway 72, which is so formed that in the "park" position the bell crank 73 is rocked downwardly, and the valve plunger 74, is moved into the valve housing 75. In this position of the valve plunger, the conventional vacuum actuator 76 communicates with the flexible hose 77, leading to a source of vacuum, such as the intake manifold (not shown) and the plunger 78, which is connected to the brake mechanism by the clevis pin 34, is drawn into the vacuum actuator 76. This action sets the brakes, as above described with respect to the solenoid operation.

It will be noted, that no electrical power is used in this construction, and therefore no switches are necessary. Actually the brake lever 15 and plate 24 could be combined into one piece in this construction, since the movement of the vacuum actuator 76 continues until the power built up in the cylinder 11 overcomes the vacuum power available. The action of the holding pawl and latch remains the same, so that failure of the vacuum power, due to engine stoppage, will not release the brakes.

In Fig. 7, I show a hydraulically powered brake mechanism, controlled by an auxiliary solenoid. The valve 74, and 75 is constructed and operates the same as previously described under the vacuum operation. In the modification shown in Fig. 7, an auxiliary solenoid 90 is used to actuate the control valve, which in turn is operated by the "park" push button 92, of a conventional push button control. It will be understood that either the construction shown in Fig. 6, or Fig. 7, can be used to control, either vacuum or the hydraulic power.

Downward movement of "park" button 92 closes the normally open switch 93, and allows current to flow through the solenoid 90, and through the switch 31, to ground. The circuit is automatically broken by the switch 31, when the brakes are set and locked, as described under the solenoid operation.

When the current flows through the solenoid 90, the armature 92A is drawn into the coil, and the valve 74 and 75 is moved into position for power to flow from the pump, or high pressure accumulator (not shown), to the cylinder 11, which operates the brake mechanism through the clevis pin 34.

When the circuit is broken by the switch 31, the valve plunger 74 and connecting armature are moved to the normal driving position, through the action of the compression spring 92B.

An auxiliary return spring 93A is shown in this construction to help in returning the mechanism to "drive" position. This spring can of course be used in all constructions if necessary.

In Figs. 1 and 9, I show a safety feature to prevent the brakes being accidently released by the foot pedal 17, when the motor is not running. Since the only convenient force available, only when the motor is running, is vacuum, I have mounted a vacuum actuator, or diaphragm 100, on an extension 10A (Fig. 1) on the base plate 10. A flexible tube 101 leads to a vacuum source, such as the intake manifold (not shown), and operates a diaphragm 102, drawing it into the actuator shell 100, when the motor is running and releasing it when the motor is idle. An eye 103 (Fig. 9) is vulcanized to the diaphragm 100 and connects through a wire 104, to the trip rod 48, as at 105. A tension spring 106 pulls the trip rod 48 downward against the pull of the diaphragm 102.

The end of the trip rod 48 is bent as shown in Fig. 9 to engage a slot 47 in the pawl 46. This slot has an enlarged portion 108 and a smaller extension 109. The rearward wall 110 of the enlarged portion 108 forms a slight undercut angle.

When the engine is not running there is no vacuum in the actuator and the diaphragm is in the extended position shown in Fig. 3, and trip rod 48 is held against the bottom of slot 47 by the spring 106. In this condition the bend in the end of trip rod 48 will ride in slot extension 109, if the foot pedal is operated, and the brake will not be released. The brake can, at all times, be released manually by pulling the rod 55.

When the engine is running, vacuum in the actuator 100 draws the diaphragm into the shell and lifts the trip rod 109 to its operating position, shown in Fig. 1. In this position, the hook on the end of the trip rod 48 engages the angle surface 110 and disengages the pawl 46, when the foot pedal 15 is moved to "driving" position. The angle surface 110 prevents accidental disengagement of the trip rod.

Referring now to Fig. 10. In this view I illustrate a roller and segment type of retainer instead of the pawl and ratchet retainers described above.

Instead of the ratchet teeth 25 a smooth finished segment 125 is provided. Instead of the retaining pawl 43, an arm 126 carrying a stud 127 and a roller 128 are provided. In all other respects, including the operation, this mechanism is the same as above described.

When the brake is set, either by the brake pedal 15, or the solenoid 35 the pawl 41 is moved from its restraining position, at the same time an arm 126 carrying the stud 127 and roller 128, moves into engagement with the segment 125 through the action of the spring 56. Setting the brake by the pedal 15, or the solenoid 35, swings the segment 125 in the direction of the arrow and it slides freely under the roller 128. The segment 125 is prevented from returning to the brake "off" position by the wedging action of the roller 128. It will be noted that a line drawn through the studs 19 and 127 and 44, closely approximates a base line drawn through the studs 19 and 127 and therefore will act as a wedge, and prevent the segment 125 from returning to the "unlocked" position. Any movement of the accelerator pedal 49 (if the motor is running), or the manual release rod 52, at any time, will swing the arm 126 in the direction of the arrow and will release the segment 125, which permits the brakes to return to "unlocked" position and normal and conventional operation.

Having described my invention, what I claim and desire to secure by Letters Patent is:

1. In a motor vehicle, having a service brake mechanism, including a foot lever for actuating said service brake, a foot actuated accelerator lever controlling the motor of said vehicle, and an automatic transmission speed selector mechanism, the combination of a member arranged for movement adjacent to the said service brake foot lever, and having an extension in contactable relation therewith, power means for actuating said last named member, locking means for contacting said member, whereby to lock said member and said service brake lever in service brake locking position, means certain of which are responsive to the movement of said automatic transmission speed selector mechanism, for actuating said power means, and means associated with said accelerator lever for releasing said locking means.

2. The structure of claim 1, in which said service brake power means are actuated only when said transmission speed selector mechanism is set in park position.

3. The structure of claim 1, in which said last named release means includes a vacuum operated device connected to the motor and is operable only when the motor of said vehicle is running.

4. The structure of claim 1, in which said last named means includes manual means for releasing said brake locking means.

5. The structure of claim 1, in which said first named member comprises a plate pivoted for movement adjacent said service brake lever, a normally closed switch secured to said plate, said switch being arranged to permit actuation of said power means, when said transmission speed selector is set in park position, and resilient means for holding said switch closed during limited movement of said brake lever.

6. The structure of claim 1, in which said power means includes a solenoid, which is controlled by two switches, one of which is actuated by means on said transmission speed selector mechanism, and the other of which is actuated by the relative movement of said service brake lever and said first named member.

7. The structure of claim 1, in which said means associated with said accelerator lever includes a rod pivoted at one end to said lever, and secured at the other end with means for lost motion to one element of said locking means, whereby said accelerator lever may be moved in conventional manner.

8. The structure of claim 1, in which the power means for actuating said service brake lever includes a vacuum actuated member, and a valve responsive to means on said transmission speed selector mechanism for controlling said vacuum member.

9. The structure of claim 1, in which the power means for actuating said service brake lever includes a hydraulically actuated member, and a valve for controlling said hydraulic member, said valve being responsive to means actuated by said transmission speed selector mechanism.

References Cited in the file of this patent

UNITED STATES PATENTS

| | | |
|---|---|---|
| 1,985,319 | Gilmore | Dec. 25, 1934 |
| 2,201,125 | Freeman | May 14, 1940 |
| 2,725,128 | Martin | Nov. 29, 1955 |
| 2,725,129 | Martin | Nov. 29, 1955 |
| 2,821,275 | Martin | Jan. 28, 1958 |